United States Patent

[11] 3,622,039

| [72] | Inventor | Bert A. Lindstrom |
| | | Rockford, Ill. |
| [21] | Appl. No. | 858,995 |
| [22] | Filed | Sept. 18, 1969 |
| [45] | Patented | Nov. 23, 1971 |
| [73] | Assignee | Elco Industries, Inc. |
| | | Rockford, Ill. |

[54] WASHER FEEDER AND ASSEMBLY UNIT
7 Claims, 13 Drawing Figs.

[52] U.S. Cl. .................................................. 221/10,
29/208 C, 29/211, 10/155, 221/162
[51] Int. Cl. ........................................................ G07f 11/00
[50] Field of Search.......................................... 221/182,
162, 163, 10, 167, 160; 10/155, 155.5; 29/208 C, 211

[56] References Cited
UNITED STATES PATENTS

| 2,914,781 | 12/1959 | Prutton | 10/155.5 |
| 3,165,232 | 1/1965 | Stern | 10/155.5 X |
| 2,699,868 | 1/1955 | Bailey et al. | 221/163 X |
| 3,011,678 | 12/1961 | McClosky et al. | 221/10 |
| 3,021,980 | 2/1962 | Gladfelter et al. | 221/167 |
| 3,021,979 | 2/1962 | Stern | 221/182 X |

*Primary Examiner*—Stanley H. Tollberg
*Attorney*—Pendleton, Neuman, Williams & Anderson ABSTRACT: This high-speed apparatus for orientating washers and feeding them to an assembly station for production of captive washer-fastening devices such as captive washer bolts comprises an inclined hopper with a base section having a rotatable annular portion with spaced grooves on the upper rotating surface thereof for receiving and rotationally conveying the washers, and a longitudinally and laterally inclined chute overlying said base section so as to receive washers from the grooves as the grooves align themselves therewith at an upper point in the rotational travel of the grooves, the orientated washers in the chute then being fed to an adjacent mechanism for assembly with bolt blanks, the assembled washers and blanks being conveyed to the starter station of a thread-rolling machine.

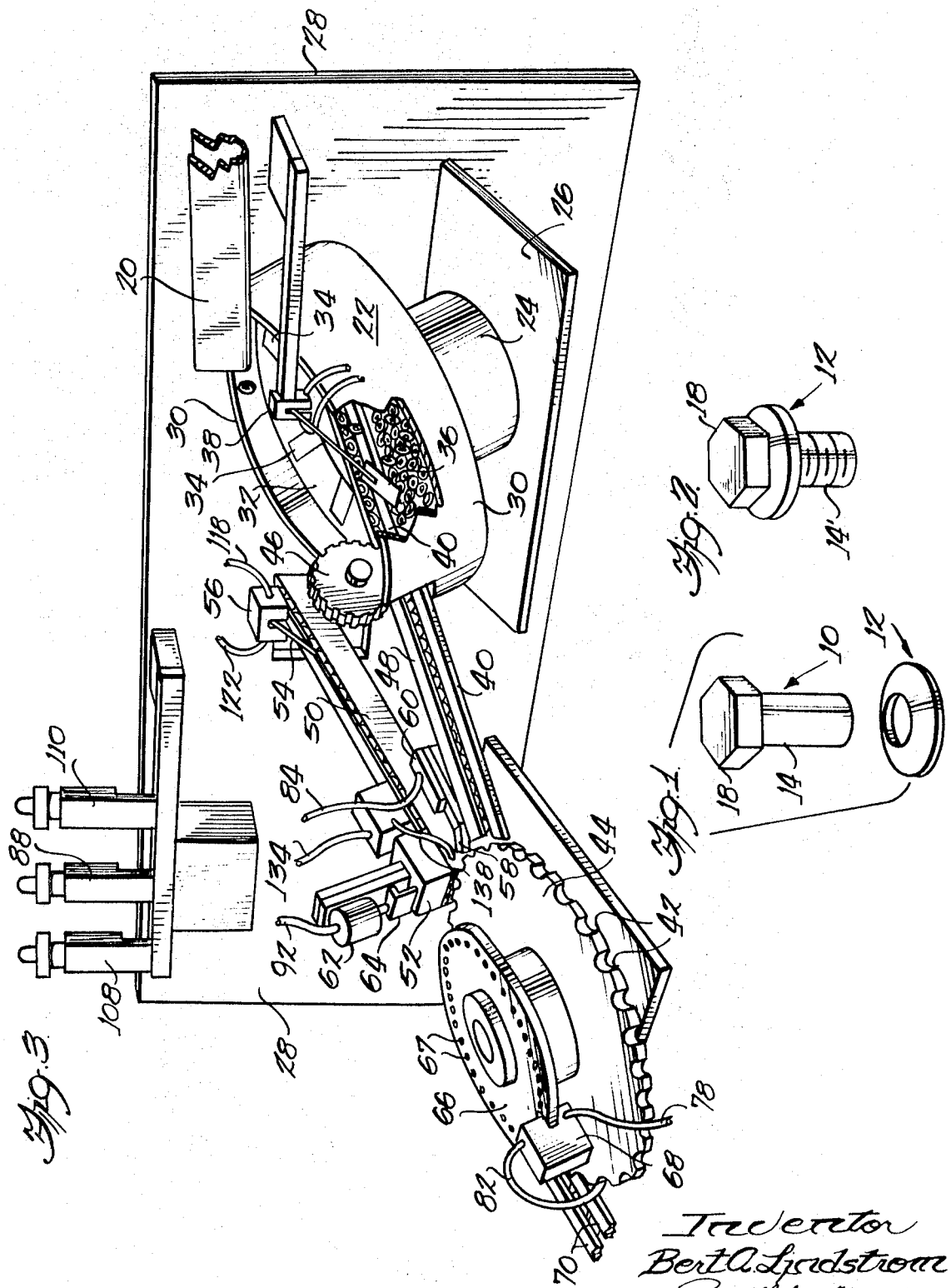

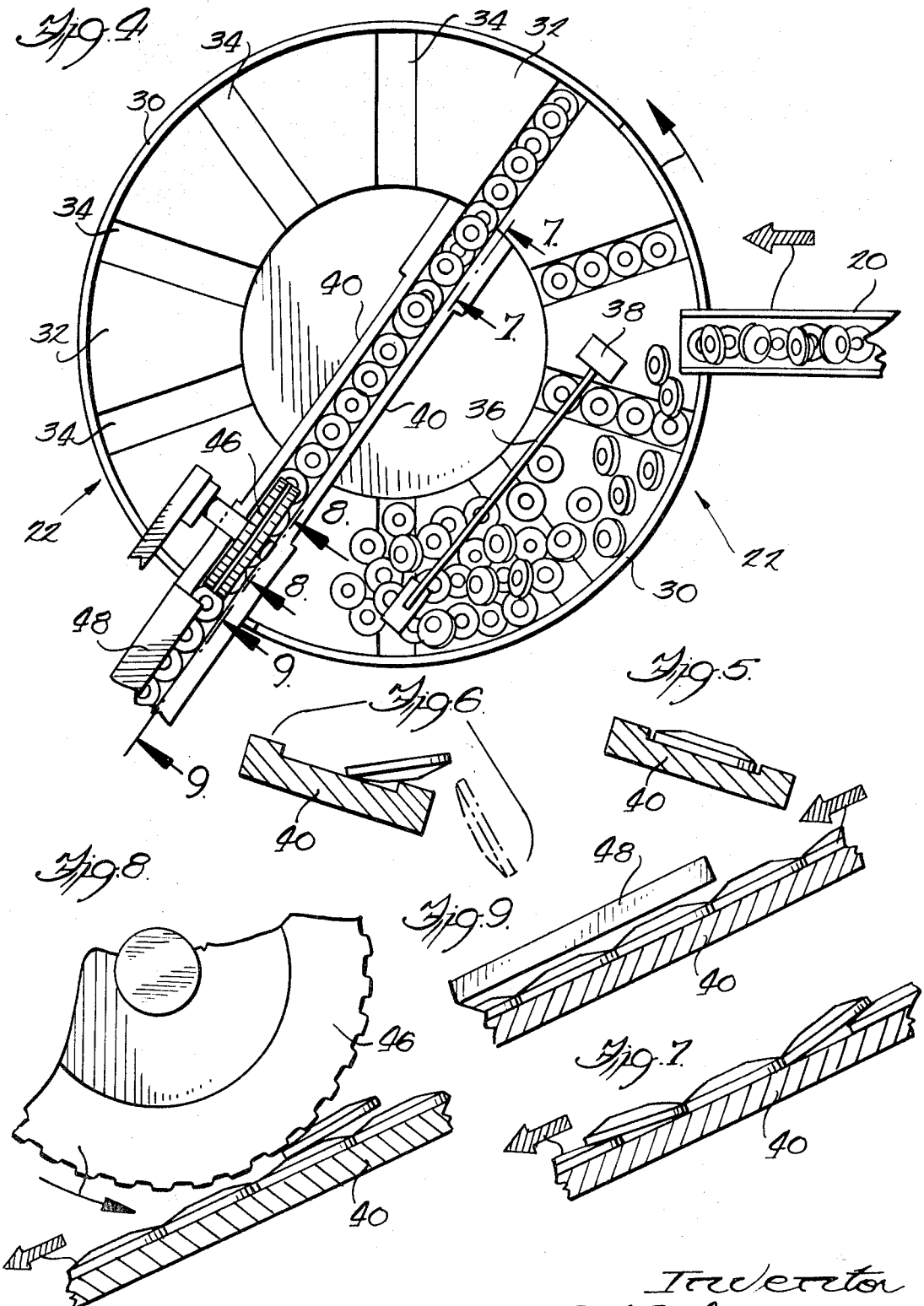

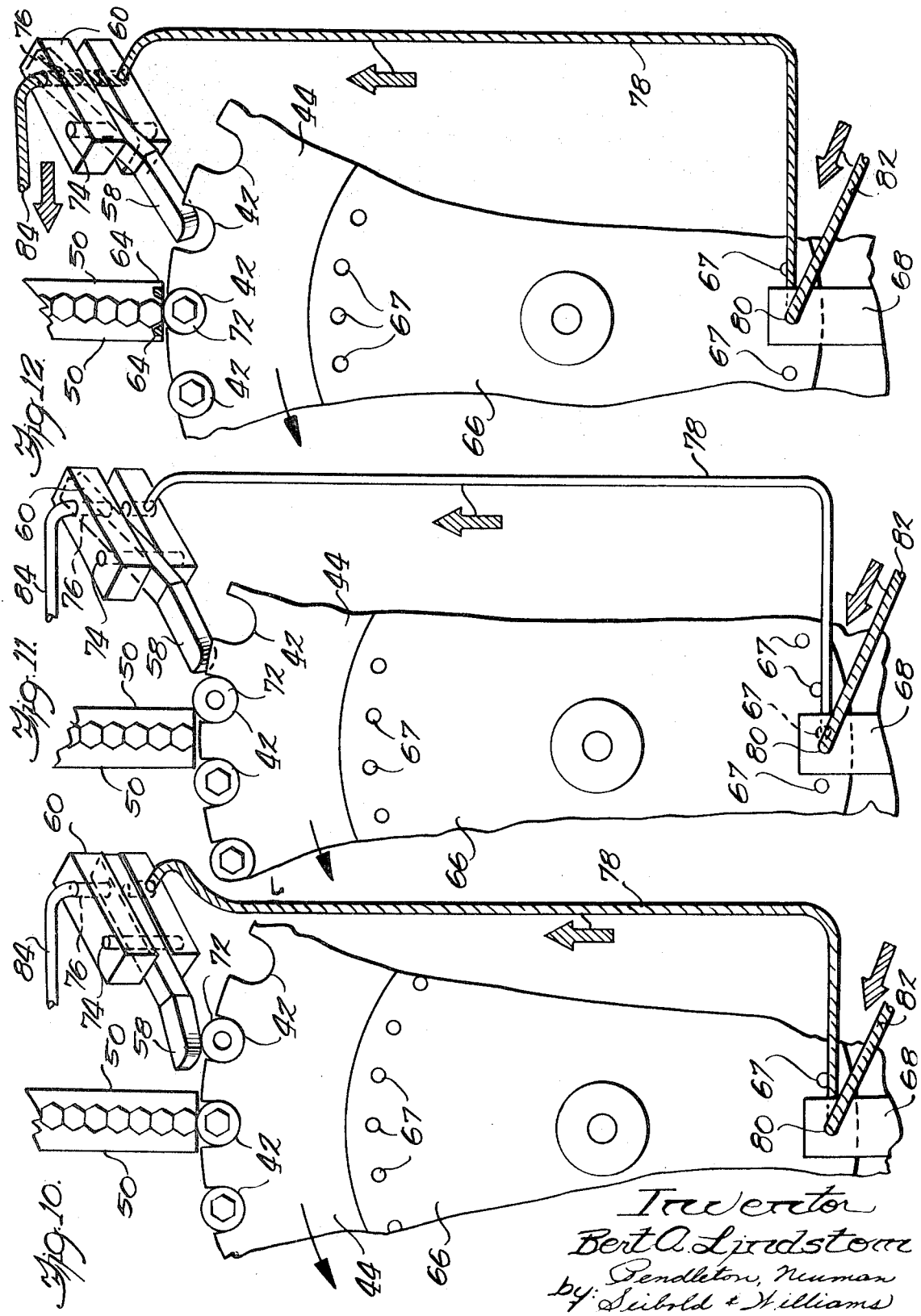

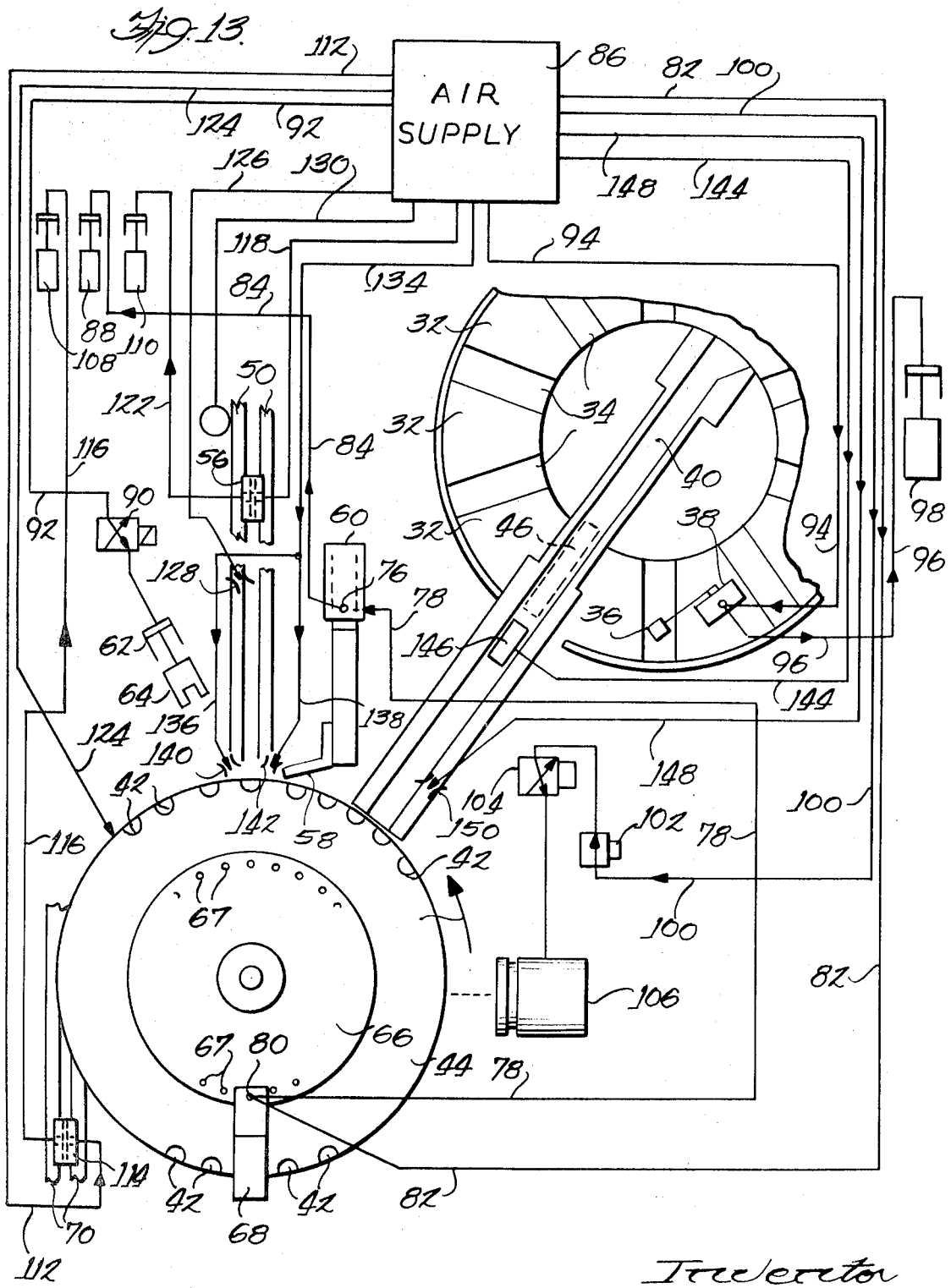

WASHER FEEDER AND ASSEMBLY UNIT

BACKGROUND OF THE INVENTION

1. Field of the Invention

This invention relates to a high-speed apparatus for orientating washers and feeding them to an assembly station for production of captive washer fastening devices such as captive washer screws, bolts and the like. More specifically, it relates to an apparatus for orientating unsymmetrically faced washers, feeding the orientated washers to an assembly station for assembly with the unthreaded shanks of fastening devices and supplying the assembled washers and shanks to a roll thread machine on a demand basis.

While the present invention is described herein with particular reference to the orientation of Belleville washers and similar crown washers for assembly with the unthreaded shanks of bolt blanks, it should be understood that the invention is not limited thereto. It can be employed for the high speed, continuous feeding of various washers including flat washers and similar articles for any desired purpose.

2. Description of the Prior Art

When producing captive washer screws, bolts and the like, the production rates of the roll thread machines, like the Waterbury and Hartford threading machines, often exceed the rate at which the assembled washer and unthreaded bolt blank can be supplied thereto. This is particularly true when using unsymmetrically faced washers such as Belleville and other crown washers, which must be properly orientated before assembly. As a result, speeds of the roll thread machines have had to be curtailed. The resultant costly loss of production with prior art feeding devices was further aggravated by the occasional misorientation of the unsymmetrically faced washers, the feeding of unassembled bolt blanks without washers, the feeding of unassembled washers without bolt blanks, or the excessive vacancies in the feeding mechanism of both bolt and washer.

Attempts to cope with these and related problems have heretofore met with only limited success. For example, in connection with the feeding of washers and the problem of vacancies, U.S. Pat. No. 3,356,260 proposes the addition of an extra dial. Admittedly, however, such expedient reduces the danger of vacancies by only about 50 percent. None of the prior attempts has coped with these problems with the same degree of success as represented by the present invention.

It is therefore a general object of the present invention to provide an apparatus which successfully copes with or otherwise alleviates the aforementioned problems. It is a more specific object to provide an apparatus which orientates unsymmetrically faced washers, feeds the washers to an assembly station, assembles the washers and unthreaded shanks of fastening devices and supplies the assembled unit to the starter station of a thread rolling machine at a faster rate than prior art devices.

It is another object to provide such apparatus with positive feed control at all points in the operation. It is a further object to provide an apparatus for orientating unsymmetrically faced washers which is substantially misorientation proof. It is another object to supply feeder apparatus which eliminates washers without bolts and guards against the supplying of bolts without washers. It is still another object to provide an apparatus for feeding, orientating and assembling washers and fastening devices which has compensatory storage at every point of the apparatus whereby disruption in production is avoided. It is still another object to supply the assembled washers and unthreaded shanks to a thread rolling machine on a demand basis or at least on a basis more closely approaching a demand basis than prior art devices.

These and other objects of the present invention will become apparent as a detailed description proceeds.

SUMMARY OF THE INVENTION

These objects are achieved in a particular embodiment, as hereinafter set forth, by a multistage apparatus which features several stages of orientation, positive control at every stage and handling speeds at each stage which exceed the capacity of most thread-rolling machines. Thus the apparatus can supply assembled bolt blanks and washers at the thread-rolling starter station at a faster rate than such thread rolling operation. The operation of the feeder is, however, intermittently interrupted to equal the speed of the thread-rolling operation and thus supply it on a demand basis. In the case of certain high-speed thread-rolling machines where the maximum speed thereof may exceed that of the feeder, the speed can be adjusted by means of variable speed drives so as to be slightly less than the feeder and thereby achieve the desired demand-basis feeder operation.

The apparatus for feeding the washers comprises a hopper having a peripheral upstanding wall section and an inclined base section for receiving the washers from a supply thereof which is responsive to the level of washers in the hopper. The inclined base section has a rotatable annular portion with spaced, radially directed grooves on the upper surface for receiving a plurality of washers flatly disposed therein. When the annular portion is rotated, the washers entrained in the grooves are conveyed from a lower portion of the hopper to an upper portion where the grooves register with a longitudinally and laterally inclined chute. The washers gravitationally slide into the chute and are conveyed out of the hopper to an adjacent assembly mechanism.

The wall heights of the grooves and the chute are sufficient to engage and convey those washers in the hopper having lower peripheral edges in contact with the respective walls. Thus, flat washers and crown washers disposed concavely downwardly will be entrained by the grooves and lifted from the lower portion of the hopper and fed into the chute. In contrast, crown washers disposed concavely upwardly are not conveyorizedly engaged by the walls of the grooves and gravitationally fall back into or remain in the lower portion of the hopper until flipped over so as to be disposed concavely downwardly. This is the first stage of orientation.

Should any misorientated washers, i.e., washers disposed concavely upwardly, be inadvertently entrained by the grooves and conveyed towards the upper portion of the hopper, the inclination of the base section, accompanied by the natural vibration of the machinery and the impact with other washers, causes many to slide out of the grooves and fall back into the bottom of the hopper. This is the second stage of orientation. If any misorientated washers reach the top of the hopper and slide into the inclined chute, the inclination of the chute is such that such misorientated washers fall therefrom back into the lower portion of the hopper, whereas orientated washers continue down the chute to the assembly mechanism. This is the third stage of orientation. Thus, in effect, the apparatus employs three stages of orientation to assure that no misorientated washers are fed to the assembly mechanism.

The wall heights of the grooves and chute, the inclination of the base section and the lateral and longitudinal inclination of the chute must be correlated with the particular nature and configuration of the washer being handled, as those skilled in the art will recognize in the light of the present disclosure, including the specific example hereinafter set forth. While the parameters must be selected in the light of the particular configuration of the washer, they are not necessarily critical. The same parameters have been found operative for several washer configurations.

The apparatus preferably also includes clearance limiting devices to intercept overlapping or "shingling" washers in the chute. Such clearance limiting means may include a rotatable wheel over the chute which is disposed so that the peripheral surfaces thereof intercept and eject any overlapping washers. It may also include an overhead rail downstream of the wheel, the height of which is adjusted to prevent shingling and the like.

The assembly mechanism which receives the orientated washers comprises a large diameter rotatable dial, e.g., 8 to 18 inches, typically 10 to 15 inches, with washer-receiving peripheral notches disposed to receive the orientated washers at one station and to convey them to a second station having means for supplying bolt blanks and gravitationally dropping the unthreaded shanks thereof through the apertures of the washers. Means are provided to prevent a bolt blank from being supplied if no washer is present in the notch at or adjacent the second station. The assembled bolt blanks and washers are then conveyed to a thread-rolling starter station where they tangentially leave the notches and enter a storage receiver prior to the thread-rolling operation.

Sensor and control means responsive thereto, preferably pneumatically actuated, are provided throughout the apparatus for positively controlling the operation at each point. Devices for expediting movements of the washers and bolts are strategically located at various points to assure the high-speed demand-type operation desired. Details of the sensor and control means and expediting devices and the like will be described in connection with the specific embodiment hereinafter set forth.

BRIEF DESCRIPTION OF THE DRAWINGS

The present invention will be more clearly understood from the following detailed description of a specific embodiment, read in conjunction with the accompanying drawings, wherein:

FIG. 1 illustrates a typical bolt blank and crown washer which are orientated and assembled by the apparatus of the present invention and fed to the starter station of a thread-rolling machine for the production of captive washer bolts;

FIG. 2 shows the completed captive washer bolt;

FIG. 3 is an overall perspective view of the washer feed mechanism and the washer and bolt assembly mechanism;

FIG. 4 is an overhead fragmentary plan view of the washer feed mechanism;

FIG. 5 is a fragmentary section view at 5—5 of FIG. 4;

FIG. 6 is a fragmentary section view similar to FIG. 5 but illustrating how an incorrectly orientated washer gravitationally falls from the chute (or grooves);

FIG. 7 is a fragmentary section view at 7—7 of FIG. 4, illustrating the problem of washer shingling;

FIG. 8 is a section view at 8—8 of FIG. 4;

FIG. 9 is a section view at 9—9 of FIG. 4;

FIGS. 10, 11 and 12 are fragmentary schematics showing three successive positions of the means for feeding or withholding bolt blanks from the assembly dial responsive to the presence or absence of a washer; and FIG. 13 is an overall schematic drawing of the pneumatic system for controlling the apparatus of FIGS. 1 through 12.

DESCRIPTION OF PREFERRED EMBODIMENT

Referring to FIGS. 1 and 2, this embodiment is employed in assembling bolt blank 10 and crown washer 12 by gravitationally inserting the unthreaded shank 14 into the aperture 16 until the crown of the washer is seated against the undersurface of bolt head 18. Thereafter shank 14 is roll threaded to produce the desired threads thereon as depicted by threaded shank 14' of FIG. 2. Since the outer thread diameter exceeds the diameter of the washer aperture, the washer is "captured," that is, not removable, once the shank is threaded.

Since crown washer 12 must be orientated so that it is disposed concavely downwardly, as depicted in FIGS. 1 and 2, before being assembled with bolt blank 10, the washer feed mechanism must provide for such orientation. Heretofore many prior art mechanisms for accomplishing such orientation and assembly could not operate fast enough to keep up with the subsequent roll threading operation and/or resulted in misorientated assemblies. As already discussed, these and other disadvantages have been overcome or alleviated by the present invention, one embodiment of which being depicted in FIG. 3.

Washers from a bulk source thereof are vibratorily fed via slightly inclined passage 20 and gravitationally fall into hopper mechanism 22 which is mounted at an inclination by means of central support 24 on support plate 26 which is rigidly secured to back plate 28. Since certain mechanical and structural details are not part of, or essential to an understanding of, the present invention and are well within the skill of the art in the light of the present disclosure, no attempt is made herein to elaborate thereon.

Hopper mechanism 22 is defined by a peripheral upstanding wall section 30 and an inclined base section having a rotatable annular portion 32 with a plurality of spaced, radial grooves 34 for receiving and conveying washers. In this embodiment annular portion 32 rotates counterclockwise as viewed in FIG. 3. The washers from washer passage 20 accumulate at the lower portion of hopper mechanism 22 until the accumulation reaches a desired level. This is detected by the lower flattened portion of detector arm 36 which actuates a blade switch in pneumatic valve 38 which in turn controls the operation of the vibratory apparatus associated with the bulk hopper and washer passage 20.

As will become apparent hereinafter, orientated washers are conveyed to the upper portion of the hopper by the radial grooves 34. As each of the grooves is successively aligned with chute 40, the washers gravitationally slide thereinto, at least until chute 40 is full, at which point the remaining washers continue to rotate in the grooves or fall to the bottom of the hopper. Washers accumulated in chute 40 are then successively fed to peripheral notches 42 in assembly dial 44, which in this embodiment also rotates counterclockwise as viewed in FIG. 3. The overlapping or shingling of washers in chute 40 is eliminated by means of rotatable wheel 46 and overhead rail 48.

Bolt blanks with shanks downward are fed from a source (not shown) via spaced, parallel inclined guide rails 50, on which the bolt heads slide, to an assembly station adjacent guide 52 and assembly dial 44. An adequate supply or "head" of bolt blanks between guide rails 50 is assured by means of sensing arm 54 of pneumatic-sensing switch 56. When a washer is present in the notch of dial 44 passing the assembly head, a bolt blank is released from guide rails 50 and the shank thereof drops through the aperture in the washer.

The presence or absence of washers in peripheral notches 42 of assembly dial 44 between the washer receiving station at the end of chute 40 and the bolt receiving station at the end of guide rails 50 is detected by finger 58 of pneumatic-sensing switch 60. If no washer is present, the piston of pneumatic cylinder 62 lowers bifurcated gate 64 through guide 52 to block the bolt blanks and prevent them from leaving guide rails 50 and dropping into the empty notch. So that detector finger 58 will not give a false reading between notches, the sensing mechanism is inactivated at such between notch locations by means of a disc valve assembly. The latter comprises perforated disc 66, which rotates with assembly dial 44 whereby a peripheral portion passes between the upper and lower jaws of pneumatic head 68. As the perforations in disc 66 align themselves with opposed registering pneumatic passages in head 68, a pneumatic circuit is completed as will become apparent from a description of FIGS. 10, 11 and 12, as well as FIG. 13.

The assembled bolt blanks and washers leaving the bolt receiving station are conveyed in the notches of assembly dial 44 and tangentially exit therefrom and slide down the parallel rails of receiver 70 of the starter station of a roll thread machine (not shown), which may be of conventional design. A supply or head of assembled bolt blanks and washers is maintained at the starter station by detector means described hereinafter in connection with FIG. 13. When the head exceeds the desired maximum level, the controls associated with the detector stop the operation of the assembly mechanism until the excess is "consumed" by the roll thread operation.

The multistage orientation of washers is illustrated in detail in FIG. 4. Accumulated washers at the lower portion of hopper 22 fill the grooves 34 of annular base portion 32 as it rotates counterclockwise beneath the accumulated washers.

As each of the grooves 34 align themselves with chute 40, the washers disposed therein gravitationally slide into the chute, to the extent possible. As base portion 32 continues to rotate, any washers not entering the chute slide out of the grooves back to the bottom of hopper 22. While not apparent in the plan view of FIG. 4, chute 40, which is faired at its upper extremity so as to slidably receive washers from the aligned grooves, is elevated slightly above base portion 32 to permit the passage of washers thereunder.

The wall height of the grooves 34 and chute 40 and the angular disposition thereof are correlated so that any improperly orientated washers either are not picked up initially by grooves 34 or, if picked up, gravitationally slide out of the grooves 34 or chute 40. This is illustrated in connection with chute 40 in FIG. 5, where the washer is properly orientated, and FIG. 6 where it is not. In a specific embodiment, the steel crown washer may have an outer diameter of about 1 3/16 inch, a peripheral wall height of about 0.05 inch and a total height to the top of the crown of about 0.08 inch. Grooves 34 and chute 40 may have a wall height of about 0.03 inch; base portion 32 as well as rails 50 may be disposed approximately 15° to 35° from the horizontal, e.g., 30° and overlying chute 40 may be disposed so that an extension thereof would intersect an extension of rails 50 at an angle of about 30° to 40°, e.g., 36°. With such parameters, substantially no misorientated washers leave the hopper assembly 22 via chute 40.

Overlapping or shingling of washers such as is illustrated in FIG. 7 is coped with by rotatable ejector wheel 46, the periphery of which engages the overlapping washers as depicted in FIG. 8 and ejects them from the chute back into the hopper proper. Any further overlapping or shingling of the washers downstream of wheel 46 is prevented by adjusting overhead rail 48 (FIG. 9) so that there is insufficient clearance for the orientated washers to ride up over one another.

The operation of the mechanism for detecting washers in peripheral notches 42 of assembly dial 44 is depicted in FIGS. 10, 11 and 12. As previously indicated, this mechanism controls pneumatic cylinder 62 which lowers a stop clamp or bifurcated gate 64 through guide 52 when a washer is missing from the adjacent notch. This prevents the roll threading of bolt blanks without washers.

In FIG. 10 the notch next approaching the bolt-blank-receiving station has received washer 72 at the washer-receiving station (not shown). The contacting surface of detector finger 58, which is spring biased in a counterclockwise direction, is deflected by the periphery of the washer 72 clockwise about pivot pin 74. This causes the opposite end portion thereof to block air passageway 76 in pneumatic valve 60. Accordingly, pressurized signal air in line 78 is prevented from passing through passageway 76 into line 84 and providing a signal whereby pneumatic cylinder 62 is actuated.

In FIG. 11, assembly dial 44 has rotated counterclockwise slightly whereby the contacting surface of detector finger 58 is no longer deflected by the washer and has rotated counterclockwise slightly. The opposite end thereof then no longer blocks air passageway 76. Pressurized air can then pass through passageway 76 into line 84 to provide a signal whereby pneumatic cylinder 62 would be actuated. But such would give a false indication of the absence of a washer. This is coped with by means of the disc valve assembly comprising perforated disc 66 and pneumatic head 68. The apertures 67 in disc 66, which is secured to and rotates with assembly dial 44, are located so that they register with passageway 80 in the jaws of pneumatic valve 68 only when detector finger 58 is located over a notch in assembly dial 44. Since in FIG. 11 detector finger 58 is between notches, compressed signal air entering pneumatic valve 68 via line 82 is blocked and thus does not enter line 78.

In FIG. 12 assembly dial 44 has rotated to the point where detector finger 58 detects the absence of a washer in the notch next entering the bolt-blank-receiving station. Under these circumstances, neither passageway 76 in valve 60 nor passageway 80 in valve 68 is blocked and thus pressurized air from line 82 flows through line 78 and via line 84 to provide a pneumatic signal which actuates a pneumatic solenoid-valve-controlling pneumatic cylinder 62. As a result, gate 64 is lowered (only the extreme bifurcated end thereof being shown in section in FIG. 12), and the bolt blank is held back as the open notch passes the bolt-blank-receiving station. While air rushes in to actuate pneumatic cylinder 62 substantially instantaneously, a pneumatic timer (not shown), e.g., a needle valve flow controller, controls the discharge of the air therefrom so that gate 64 remains lowered until at least the open notch has passed the bolt-blank-receiving station.

Additional details of this embodiment of the sensing mechanism for detecting the presence or absence of washers and for controlling gate 64 in response thereto are shown in FIG. 13. This figure is a schematic of the entire pneumatic system, each aspect of which is now briefly reviewed.

Referring to FIG. 13 and the washer-sensing mechanism, pressurized signal air from air supply 86 passes via line 82 through the passageway 80 of valve 68, thence via line 78 through passageway 76 of valve 60, and thence through line 84 to pneumatic solenoid valve 88. This actuates valve 90 whereby compressed air from air supply 86 is charged via line 92 to pneumatic cylinder 62, which controls gate 64.

It should be understood, of course, that alternative pneumatic, electrical, electronic or mechanical means for detecting or sensing the absence of washers in the notches may also be employed as those skilled in the art will recognize in the light of the present disclosure. For example, to eliminate the disc valve assembly 66 and 68 and associated structure, the portion of detector finger 58 adjacent the periphery of notched dial 44 may be shaped to correspond approximately to the circular curvature of the dial and be of sufficient length to straddle two successive notches. Thus, before one notch rotates out from under one extremity of the contacting surface of the detector finger, the next succeeding notch has already come under the other extremity. Accordingly, the finger will be responsive only to the presence or absence of washers in the notches and not to any between notch lands. With the elimination of disc 66 and head 68 in this embodiment, lines 82 and 78 are directly connected and form one continuous line from air supply 86 to valve 60.

Continuing with the description of FIG. 13, signal air from air supply 86 passes via line 94 through pneumatic blade switch 38, which is actuated by detector arm 36, as previously described, and thence via line 96 to pneumatic solenoid valve 98. When the level of washers in hopper 22 falls below a desired level, the blade pivots so as to allow passage of the signal air whereby valve 98 actuates a vibratory feeder. As a result, washers are fed via passage 20 into hopper 22 until the level of washers reaches the desired level again and the signal air is cut off.

Pressurized air from air supply 86 also passes via line 100 through push-pull mechanical valve 102 and electrically actuated air valve 104 to air clutch 106. This air clutch controls the rotation of assembly dial 44 and perforated disc 66. Operation of the assembly dial may be stopped or started by manually actuating push-pull valve 102. The operation of assembly dial 44 is also controlled by the position of air valve 104. Air valve 104 is controlled in turn by either pneumatic solenoid valve 108 or pneumatic solenoid valve 110.

Pneumatic solenoid valve 108 is responsive to signal air from supply 86 which flows via line 112, pneumatic-sensing valve 114 and line 116. Pneumatic-sensing valve 114 detects the head of assembled washers and bolt blanks in receiver 70 of the starter station of the roll thread machine. When the head exceeds the desired level, pneumatic solenoid valve 108 is actuated so as to control air valve 104 and thus disengage clutch 106. This stops assembly dial 44 and prevents a pileup of assembled washers and bolt blanks in receiver 70.

Similarly, signal air from air supply 86 passes via line 118 through pneumatic sensing valve 56 which is responsive to the head of bolt blanks in guide rails 50. Should the supply of bolt blanks supported by rails 50 fall below a desired predetermined level, which level is desired to assure rapid transfer of bolt blanks to the notches of assembly dial 44, air passes through valve 56 and line 122 to pneumatic solenoid valve 110. This also controls air valve 104 and clutch 106 so as to shut off assembly dial 44 until the minimum desired head of bolt blanks on rails 50 is built up again.

The air-sensing valves or switches 114 and 56, which are used to detect the aforementioned heads, may take the form of simple blade valves wherein the blade is actuated by a detector arm. The blade blocks or unblocks an air passage as the arm detects the presence or absence of the object being detected. In the case of switch 56 the detector arm is indicated in FIG. 3 as sensing arm 54.

Compressed air from air supply 86 also passes via line 124 to provide an air blast at notches 42 of assembly dial 44 downstream of the washer and bolt-blank-receiving stations. This air blast ejects washers without bolt blanks from the notches of the assembly dial.

Pressurized air from air supply 86 is also charged via line 126 to air assist jet 128 which aids the flow of bolt blanks down guide rails 50. Compressed air from air supply 86 is also charged via line 130 to vibrator 132, which also assists the flow of bolt blanks down guide rails 50. Similarly, compressed air from air supply 86 is charged via lines 134, 136 and 138 to air assist jets 140 and 142, respectively, so as to assist in the rapid transfer of the bolt blanks from guide rails 50 into the aperture of the washer in the adjacent notch of assembly dial 44.

Compressed air for air supply 86 is also charged via line 144 to a plurality of air jets 146, which assist the flow of washers down chute 40. The washers are further assisted down chute 40 by pressurized air from air supply 86 which flows via line 148 into air assist jet 150.

It is apparent from the above description that at every point in the system positive control of the particular element is present. Thus, for example, the supply of washers in chute 40 is automatically maintained by supplying washers at an excess rate into chute 40, the excess washers falling into the lower portion of hopper 22. Likewise, a head of bolt blanks is maintained in guide rails 50, any shortage thereof resulting in the disengagement of air clutch 106 whereby assembly dial 44 is stopped. Still further, a desired head of assembled bolt blanks and washers is maintained in receiver 70 by running all upstream systems at a faster rate than the thread-rolling machine and shutting down assembly dial 44 whenever the supply of assembled washers and bolt blanks in receiver 70 exceeds the desired level.

From the above description it is apparent that the objects of the present invention have been achieved. While only certain embodiments have been illustrated, many alternative modifications will be apparent from the above description to those skilled in the art. These and other alternatives are considered within the spirit and scope of the present invention, and coverage thereof is intended by this application.

Having described the invention, what is claimed is:

1. An apparatus for successively and continuously feeding washers and assembling the same with shanks, said apparatus comprising:
   a. a hopper having a peripheral upstanding wall section and an inclined base section for receiving washers to be fed to said assembly station, said base section having a rotatable annular portion with spaced grooves on the upper surface thereof for receiving and conveying a plurality of washers therein;
   b. means for supplying washers to said hopper from a source thereof responsive to the level of washers in said hopper;
   c. means for rotating said annular portion;
   d. a longitudinally and laterally inclined chute overlying at least a portion of said base section, the upper extremity of said chute being disposed in washer-receiving registration with the inner extremities of said grooves at an upper point in the rotational travel of the grooves, the lower portion of said chute passing out of said hopper; and
   e. an adjacent assembly mechanism in washer-receiving communication with said lower portion of said chute, said assembly mechanism comprising;
      1. a rotatable dial with washer-receiving notches disposed at one station of said assembly mechanism to successively receive a washer in each notch from said chute;
      2. means for supplying shanks at a second station of said assembly mechanism for assembly in said notches with said washers; and
      3. means at said second station for withholding a shank from said notches responsive to the absence of a washer in the notch;

whereby washers in said hopper are successively and continuously picked up by said grooves at a lower point in the rotational travel thereof, gravitationally transferred to said chute at an upper point in the rotational travel thereof, and gravitationally fed to said adjacent assembly mechanism for assembly with said shanks.

2. An apparatus for successively and continuously feeding washers and assembling the same with shanks, said apparatus comprising:
   a. a washer feed mechanism comprising
      1. a washer hopper with means for transferring washers therefrom and
      2. an inclined chute passing out of said hopper for successively and continuously receiving washers transferred from said hopper and gravitationally conveying the washers to an adjacent assembly zone; and
   b. a washer assembly mechanism in said adjacent assembly zone comprising:
      1. a rotatable dial with washer-receiving notches disposed at one station of said assembly mechanism to successively receive a washer in each notch from said chute;
      2. means for supplying shanks at a second station of said assembly mechanism for assembly in said notches with said washers; and
      3. means at said second station for withholding a shank from said notches comprising a gate pneumatically lowered responsive to the absence of a washer in the notch.

3. An apparatus for successively and continuously feeding washer and assembling the same with shanks, said apparatus comprising:
   a. a washer feed mechanism comprising
      1. a washer hopper with means for transferring washers therefrom and
      2. an inclined chute passing out of said hopper for successively and continuously receiving washers transferred from said hopper and gravitationally conveying the washers to an adjacent assembly zone; and
   b. a washer assembly mechanism in said adjacent assembly zone comprising:
      1. a rotatable dial with washer-receiving notches disposed at one station of said assembly mechanism to successively receive a washer in each notch of from said chute;
      2. means for supplying shanks at a second station of said assembly mechanism for assembly in said notches with said washers, said means for supplying shanks including a detector for sensing the quantity of shanks available at said second station and a switch for controlling the rotation of said dial in response thereof; and
      3. means at said second station for withholding a shank from said notches responsive to the absence of a washer in the notch.

4. An apparatus for successively and continuously feeding washers and assembling the same with shanks, said apparatus comprising:
   a. a washer feed mechanism comprising
      1. a washer hopper with means for transferring washers therefrom and
      2. an inclined chute passing out of said hopper for successively and continuously receiving washers transferred from said hopper and gravitationally conveying the washers to an adjacent assembly zone; and b. a washer assembly mechanism in said adjacent assembly zone comprising:
1. a rotatable dial with washer-receiving notches disposed at one station of said assembly mechanism to successively receive a washer in each notch from said chute;
2. means for supplying shanks at a second station of said assembly mechanism for assembly in said notches with said washers, said means for supplying shanks including an air jet to impel the shanks into said notches; and
3. means at said second station for withholding a shank from said notches responsive to the absence of a washer in the notch.

5. An apparatus for successively and continuously feeding washers and assembling the same with shanks, said apparatus comprising:

a. a washer feed mechanism comprising
1. a washer hopper with means for transferring washers therefrom and
2. an inclined chute passing out of said hopper for successively and continuously receiving washers transferred from said hopper and gravitationally conveying the washers to an adjacent assembly zone; and b. a washer assembly mechanism in said adjacent assembly zone comprising:
1. a rotatable dial with washer-receiving notches disposed at one station of said assembly mechanism to successively receive a washer in each notch from said chute;
2. means for supplying shanks at a second station of said assembly mechanism for assembly in said notches with said washers;
3. a feeder for said means for supplying shanks and wherein said means for supplying shanks includes a shank supply sensor and control for activating said feeder in response to said sensor; and
4. means at said second station for withholding a shank from said notches responsive to the absence of a washer in the notch.

6. An apparatus for successively and continuously feeding washers and assembling the same with shanks, said apparatus comprising:

a. a washer feed mechanism comprising
1. a washer hopper with means for transferring washers therefrom and
2. an inclined chute passing out of said hopper for successively and continuously receiving washers transferred from said hopper and gravitationally conveying the washers to an adjacent assembly zone; and b. a washer assembly mechanism in said adjacent assembly zone comprising:
1. a rotatable dial with washer-receiving notches disposed at one station of said assembly mechanism to successively receive a washer in each notch from said chute;
2. means for supplying shanks at a second station of said assembly mechanism for assembly in said notches with said washers;
3. means at said second station for withholding a shank from said notches responsive to the absence of a washer in the notch; and
4. a receiver for receiving the assembled washers and shanks from said assembly mechanism and sensing and control means for detecting the quantity of assembled washers and shanks in said receiver and controlling the operation of said assembly mechanism in response thereto.

7. The apparatus of claim 6 including ejector means between said second station and said receiver for ejecting unassembled washers from the notches of said rotatable dial.

* * * * *